US012418712B2

(12) United States Patent
Rupp et al.

(10) Patent No.: US 12,418,712 B2
(45) Date of Patent: Sep. 16, 2025

(54) CAMERA ASSEMBLY FOR VEHICLE AND VEHICLE INCLUDING SAME

(71) Applicant: Honda Motor Co., Ltd., Tokyo (JP)

(72) Inventors: Timothy J. Rupp, Dublin, OH (US); Connor Isings, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 131 days.

(21) Appl. No.: 18/508,700

(22) Filed: Nov. 14, 2023

(65) Prior Publication Data

US 2025/0159327 A1    May 15, 2025

(51) Int. Cl.
*B60J 10/00*    (2016.01)
*B32B 17/10*    (2006.01)
*B60J 10/70*    (2016.01)
*H04N 23/57*    (2023.01)
*B60R 11/00*    (2006.01)

(52) U.S. Cl.
CPC ....... *H04N 23/57* (2023.01); *B32B 17/10036* (2013.01); *B60J 10/70* (2016.02); *B60R 2011/0026* (2013.01)

(58) Field of Classification Search
CPC .... H04N 23/57; B32B 17/10036; B60J 10/70; B60R 2011/0026; B60R 11/04
See application file for complete search history.

(56) References Cited

U.S. PATENT DOCUMENTS

| 7,322,755 | B2 |   | 1/2008  | Neumann et al. |
|-----------|----|---|---------|----------------|
| 8,067,077 | B2 | * | 11/2011 | Bauer ...................... H01Q 1/22 428/40.9 |
| 8,934,052 | B2 | * | 1/2015  | Luan ..................... H10F 39/804 348/374 |
| 9,097,375 | B2 | * | 8/2015  | Hanson ................... F16J 15/008 |
| 9,857,797 | B2 |   | 1/2018  | Hara et al. |
| 9,976,973 | B2 | * | 5/2018  | Watkins .............. G01N 15/134 |
| 10,054,721 | B2 | * | 8/2018 | Hsu ......................... G02B 7/021 |
| 10,155,824 | B2 | * | 12/2018 | Fujikawa ............. A61Q 19/007 |
| 10,347,179 | B2 | * | 7/2019 | Kim ..................... G09G 3/3266 |
| 11,279,108 | B2 |   | 3/2022  | Bard et al. |
| 2009/0078873 | A1 | * | 3/2009 | Sakemoto ................. G01J 5/58 250/339.11 |
| 2010/0046059 | A1 | * | 2/2010 | McCabe ............. G02B 5/0858 359/263 |

(Continued)

FOREIGN PATENT DOCUMENTS

DE    202009018488 U1    2/2012
WO    2022117943 A1    6/2022
WO    2023140220 A1    7/2023

*Primary Examiner* — Frank F Huang
(74) *Attorney, Agent, or Firm* — KENEALY VAIDYA LLP

(57) ABSTRACT

A camera assembly for a vehicle can include a first glass pane, a second glass pane, a garnish panel and a camera. The vehicle can have a side panel and a window opening in the side panel. The first glass pane can be configured to cover the widow opening and have a first light transmissivity. The second glass pane can be configured to cover a portion of the side panel that is adjacent to the opening and have a second light transmissivity that is greater than the first light transmissivity. The garnish panel can extend across the second glass pane. The camera can oppose the second glass pane.

20 Claims, 4 Drawing Sheets

(56) References Cited

U.S. PATENT DOCUMENTS

| | | | |
|---|---|---|---|
| 2011/0144284 A1* | 6/2011 | Heuer | C08L 69/00 525/394 |
| 2013/0106787 A1* | 5/2013 | Lee | H04N 23/50 345/175 |
| 2015/0181099 A1* | 6/2015 | Van Der Tempel | G01S 7/4911 348/135 |
| 2017/0220844 A1* | 8/2017 | Jones | G06V 40/1318 |
| 2018/0048909 A1* | 2/2018 | Liu | H04N 19/105 |
| 2018/0081093 A1* | 3/2018 | Wang | H04N 23/20 |
| 2018/0124394 A1* | 5/2018 | Xu | H04N 19/573 |
| 2018/0152727 A1* | 5/2018 | Chuang | H04N 19/70 |
| 2020/0398646 A1 | 12/2020 | Mujcinovic et al. | |
| 2021/0372645 A1* | 12/2021 | Harder | F24F 11/52 |
| 2022/0132047 A1 | 4/2022 | Nagashima et al. | |
| 2022/0250555 A1 | 8/2022 | Blanche et al. | |
| 2022/0347974 A1 | 11/2022 | Sadakane et al. | |
| 2023/0038114 A1 | 2/2023 | Davis et al. | |
| 2023/0096675 A1 | 3/2023 | Chiba | |

* cited by examiner

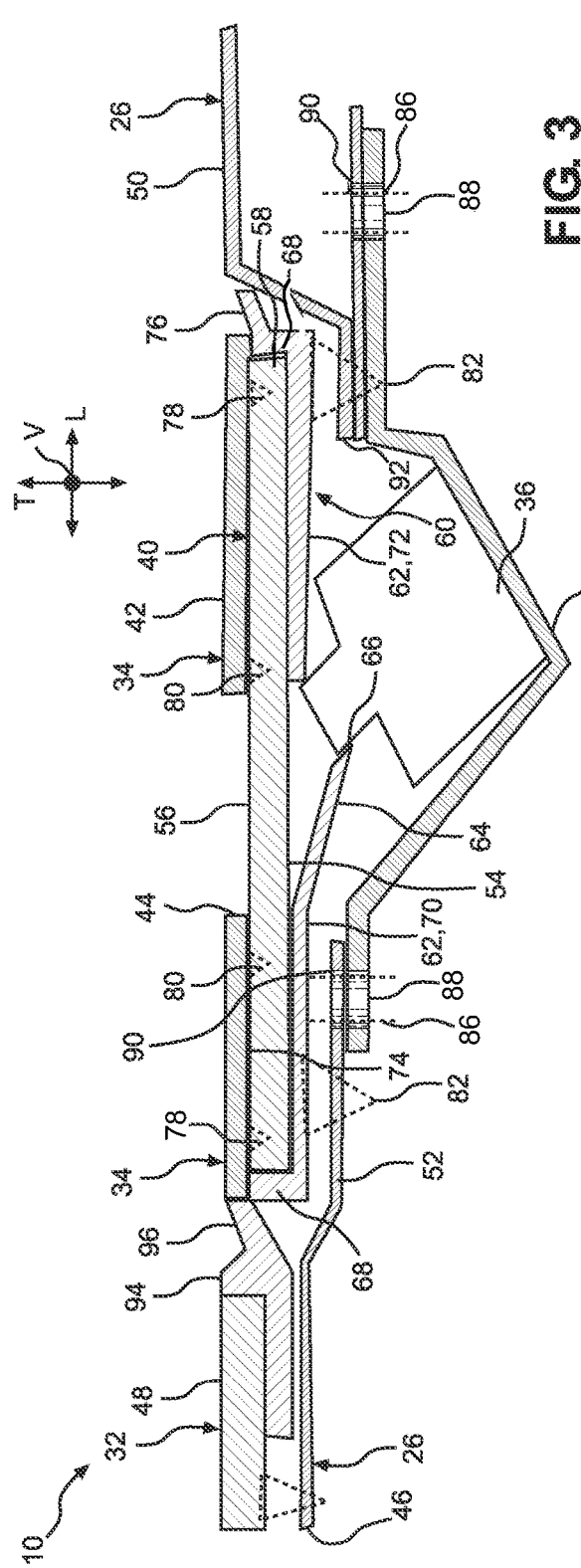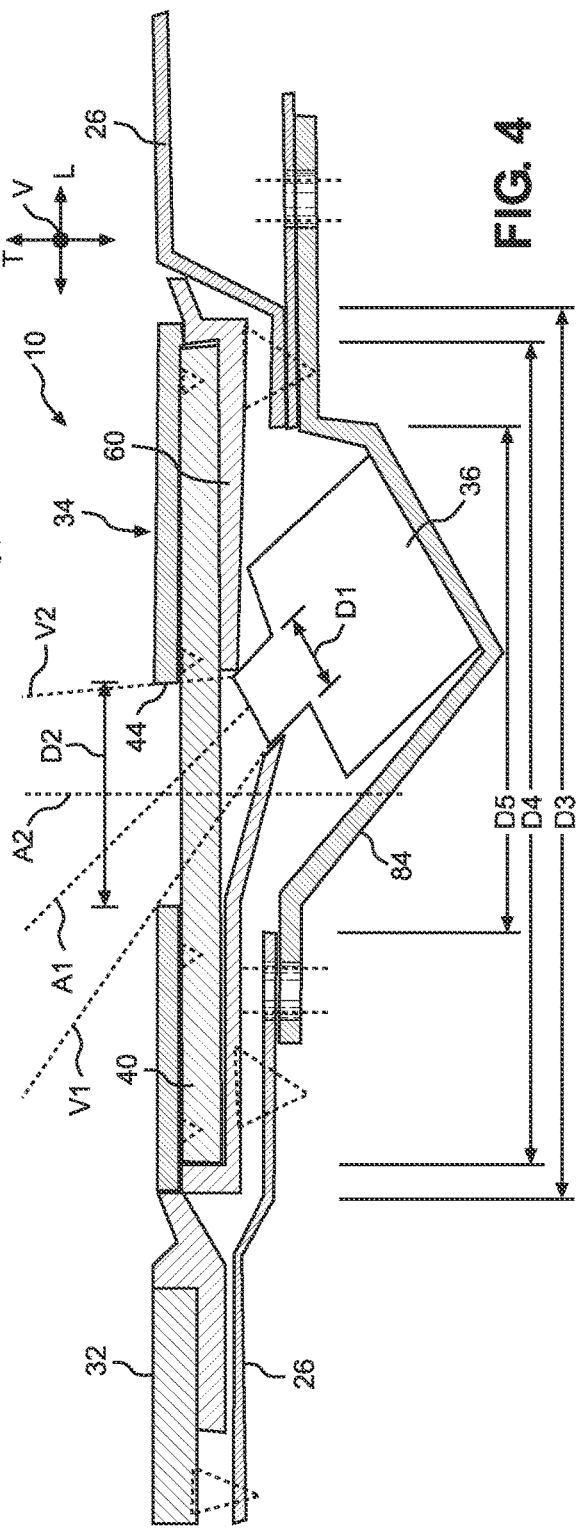

CAMERA ASSEMBLY FOR VEHICLE AND VEHICLE INCLUDING SAME

BACKGROUND

The disclosed subject matter relates to a camera assembly for a vehicle. More particularly, the disclosed subject matter relates to methods and apparatus that can provide the appearance of a continuous privacy glass pane for a vehicle while transmitting ambient light to a camera located behind the pane that is sufficient for the desired operation of the camera.

A vehicle can include one or more cameras that are arranged to provide a respective view of the space outside of the vehicle and provide real-time images to the driver and/or a controller of a driver assistance system or an autonomous vehicle. For example, the vehicle can include a camera mounted at the rear end of the vehicle that provides a video image for the driver when the vehicle travels in reverse. The vehicle can also include cameras that capture images of the space along the two sides of the vehicle and at the front of the vehicle. The cameras can be concealed behind a transparent panel or pane and can be sealed in a compartment that protects the camera from dust, debris and fluids in the space outside of the vehicle.

SUMMARY

Some embodiments are directed to a camera assembly for a vehicle that can include a first glass pane, a second glass pane, a garnish panel and a camera. The vehicle can have a side panel and a window opening in the side panel. The first glass pane can be configured to cover the widow opening and have a first light transmissivity. The second glass pane can be configured to cover a portion of the side panel that is adjacent to the window opening and have a second light transmissivity that is greater than the first light transmissivity. The garnish panel can extend across the second glass pane. The camera can oppose the second glass pane.

Some embodiments are directed to a camera assembly for a vehicle that can include a camera, a first glass pane, a second glass pane, a garnish panel and an adhesive sealant. The first glass pane can have a first light transmissivity and be spaced away from the camera. The second glass pane can be adjacent to the first glass pane and overlap the camera. The second glass pane can have a second light transmissivity that is greater than the first light transmissivity. The garnish panel can cover the second glass pane and include a through hole configured to be aligned with the camera. The adhesive sealant can connect the garnish panel to the second glass panel.

Some embodiments are directed to a vehicle that can include a side panel, a first glass pane, a second glass pane, a garnish panel and a camera. The side panel can extend along a longitudinal direction of the vehicle, and can include a window opening. The first glass pane can be mounted on the side panel, cover the widow opening and have a first light transmissivity. The second glass pane can be mounted on a portion of the side panel that is adjacent to the window opening in the longitudinal direction. The second glass pane can have a second light transmissivity that is greater than the first light transmissivity, and can include an outer surface and an inner surface. The garnish panel can be adhered to the outer surface of the second glass pane. The camera can be mounted on the side panel and oppose the inner surface of the second glass pane. The camera can have an optical axis that intersects the longitudinal direction at an oblique angle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIGS. 3 and 4 are cross-sectional views taken along line 3-3 of FIG. 2.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

In a vehicle, a camera can be mounted behind a transparent cover or panel made of plastic or glass to observe or monitor a space adjacent the vehicle. The camera can be any known type of digital camera including what is known in the vehicle art as a safety camera. In some cases, an opening or space for the camera and a transparent panel sealing the space occupied by the camera can be seen by an observer outside of vehicle. The observer might perceive this arrangement as detracting from the aesthetic appearance of the vehicle Thus, it can be advantageous to mount the camera behind one of the glass panes forming a window of the vehicle. In such a location, the camera can receive light from outside the vehicle via the window glass without detracting from the aesthetic appearance of the vehicle.

A vehicle can include a plurality of window openings that are covered by glass panes. Some glass panes can be referred to as privacy glass. The privacy glass can be tinted with a dark color such as, but not, limited to, a brown or a black color. Privacy glass can limit the extent to which an observer can clearly see the inside of the vehicle. Thus, privacy glass can be advantageous for the security and privacy of the contents and passengers, and reduce the solar heat input to the passenger space in the vehicle. Privacy glass can also enhance the aesthetic appearance of the vehicle.

Due to the low light transmissivity, it can be disadvantageous to mount a camera behind a pane of privacy glass. Green glass can also be used on a vehicle to cover a window opening in the body panel. Green glass can have a light green tint and a light transmissivity that is greater than that of privacy glass. The light transmissivity of green glass can be sufficient for the performance desired for a camera, such as a safety camera. However, using green glass and privacy glass on the same portion of the vehicle can detract from the aesthetic appearance of the vehicle.

Thus, there is a need for a camera assembly that can be compatible with the aesthetic appeal of privacy glass.

Figure 1:
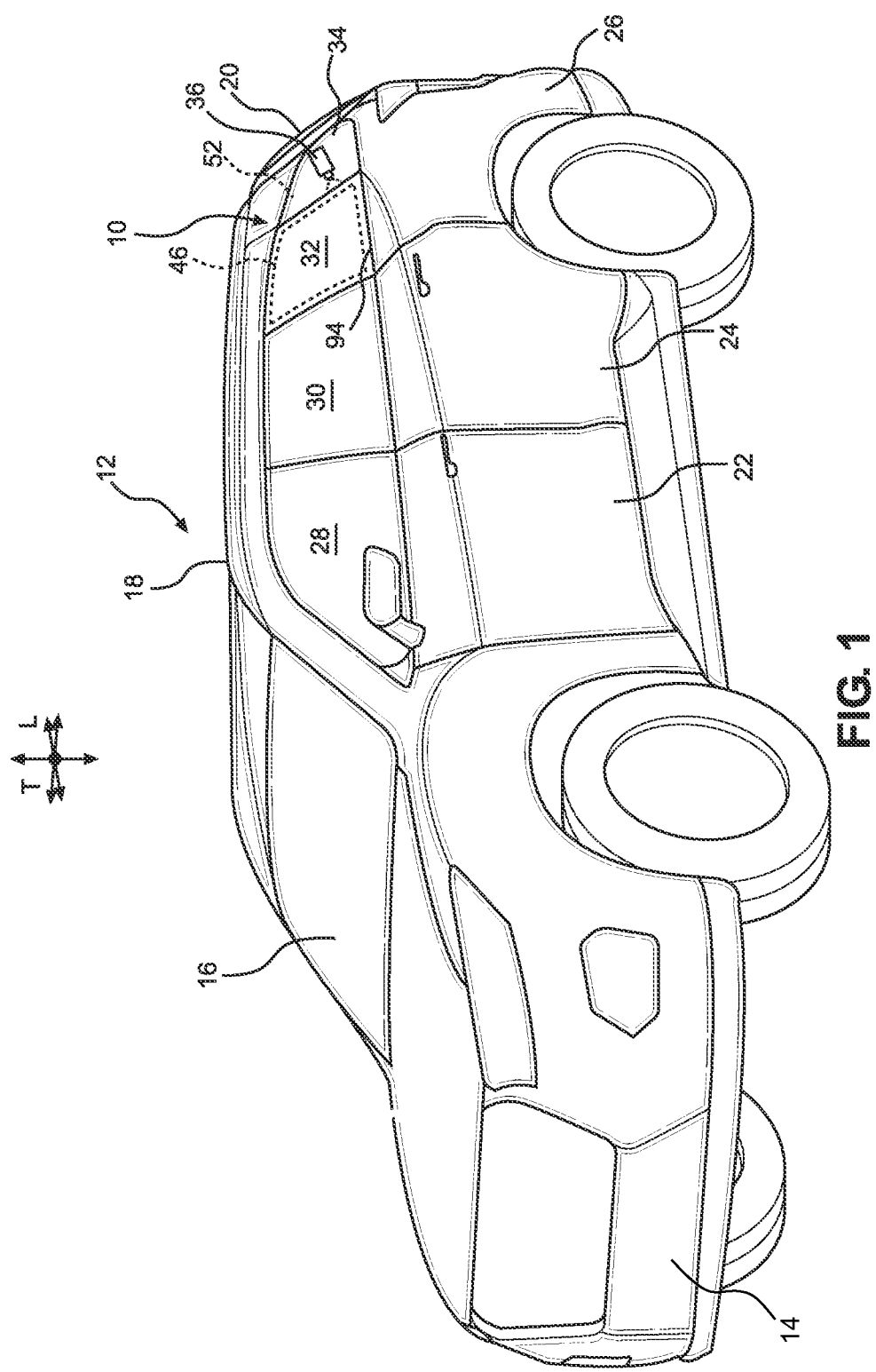
FIG. 1 is a schematic illustration of a perspective view of a vehicle including a camera system made in accordance with principles of the disclosed subject matter.
Figure 2:
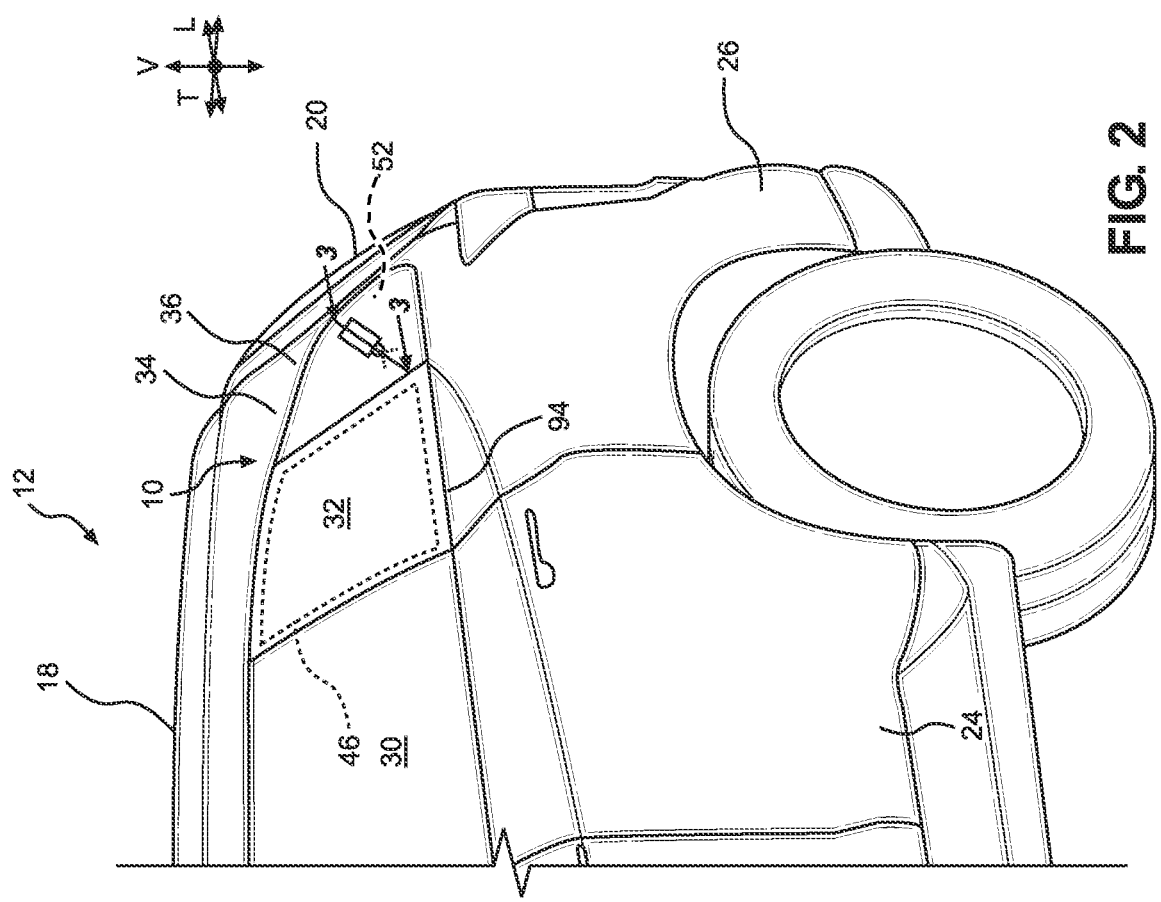
FIG. 2 is an enlarged view of the rear half of the vehicle of FIG. 1.

FIGS. 1 and 2 illustrate an embodiment of a safety camera system 10 for a vehicle 12 made in accordance with principles of the disclosed subject matter. FIGS. 1 and 2 show the left side of the vehicle 12 and a front end 14 of the vehicle 12. The right side of the vehicle 12 can be a mirror image of the left side. The vehicle 12 can extend in a longitudinal direction L, a transverse direction T and vertical direction V.

The vehicle 12 can include a front windshield 16, a glass roof panel 18, a rear windshield 20, a front door 22, a rear door 24 and a side panel 26. The front door 22 can include a front glass pane 28 and the rear door 24 can include a rear glass pane 30. The rear windshield 20 can also be referred to a rear window, a backlight, a tailgate glass or a liftgate glass. The glass roof panel 18 can be referred to as a glass pane and be a fixed panel or a movable panel. The glass roof panel 18 can be referred to as a sunroof or a moon roof if the glass roof panel 18 is movable.

The front windshield 16 and the front glass pane 28 can be green glass panes and the glass roof panel 18, the rear windshield 20 and the rear glass pane 30 can be privacy glass. The safety camera assembly 10 can be located between the glass roof panel 18, the rear glass pane 30 and the rear windshield 20 in the longitudinal direction L of the vehicle 12. Thus, it can be advantageous for the safety camera assembly 10 to have an external appearance that is the same as or complimentary to privacy glass.

The safety camera assembly 10 can include a first glass pane 32, a garnish panel 34 and a camera 36. The first glass pane 32 can be privacy glass and the garnish panel 34 can have an exterior surface that is visually compatible with the aesthetic appearance of privacy glass. Thus, an observer can perceive the outside of the vehicle 12 as having a continuous expanse of privacy glass that extends from the rear glass pane 30 to the rear windshield 20, inclusively.

Referring to FIG. 3, the safety camera assembly 10 can include a second glass pane 40. The second glass pane 40 can be made from green glass or any other appropriate type of glass that can transmit an amount of light that is sufficient for the desired performance of the camera 36. That is, the second glass pane 40 can have a light transmissivity that is greater than the light transmissivity of the first glass pane 32, the glass roof panel 18, the rear glass pane 30 and the rear windshield 20, and a color that is different from the color of the first glass pane 32, glass roof panel 18, the rear glass pane 30 and the rear windshield 20.

Figure 5:
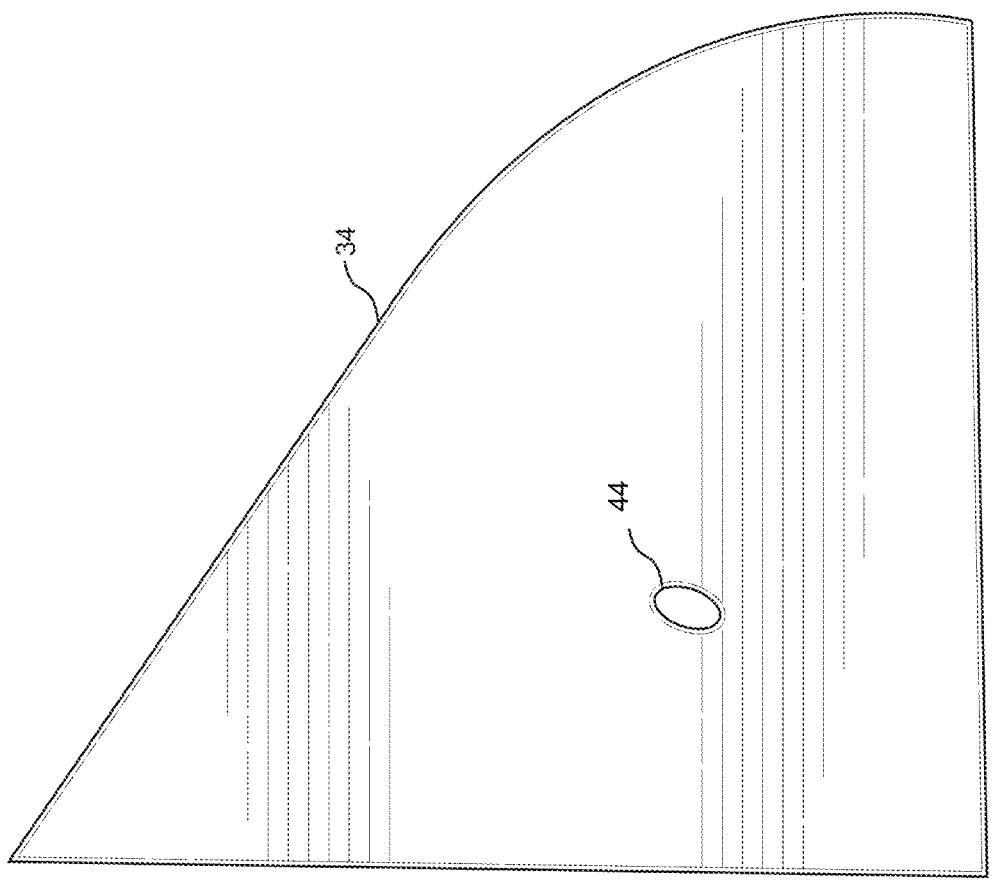
FIG. 5 is a plan view of a garnish panel of the camera system of FIG. 1.

The garnish panel 34 can be made from plastic and include an exterior surface 42 that has a color and gloss finish that matches, or is aesthetically compatible with, the color and gloss finish of the of the first glass pane 32, glass roof panel 18, the rear glass pane 30, and the rear windshield 20. The garnish panel 34 can extend across the second glass pane 40 along the longitudinal direction L and the vertical direction V of the vehicle 12. The garnish panel 34 can be opaque so that the garnish panel 34 can conceal the camera 36 from the view of an observer located outside of the vehicle 12. Referring to FIGS. 3 and 5, the garnish 34 can include a through hole 44. Referring to FIG. 4, the camera 36 can have an optical axis A1 that extends through the through hole 44.

Thus, light from the space outside of the vehicle 36 can pass through the through hole 44 and the second glass pane 40 and enter the camera 36. The camera 36 can be configured to form image data from the light that enters camera 36. The image data can represent the object(s) in the space outside of the vehicle 12 and can be processed by a display device for presentation to the operator of the vehicle 12.

Referring to FIGS. 1-3, the side panel 26 can be made from any appropriate material such as, but not limited to, steel, aluminum alloy, carbon fiber, fiber-reinforced plastic, sheet molded plastic, or fiberglass, or a composite that includes any one or more of the these materials, or a composite that includes any one of these materials and another material. The side panel 26 can include a window opening 46 and the first glass pane 32 can cover the window opening 46. Referring to FIG. 3, the first glass pane 32 can include an exterior surface 48 that faces the outside of the vehicle 12. The side panel 26 can include an exterior surface 50 that faces the outside of the vehicle 12. The exterior surface 42 of the garnish panel 34 can be co-planar with the exterior surfaces 48, 50. The surfaces 42, 48, 50 can be described as being flush with each other, or at least can appear to an observer to be flush with each other.

The second glass pane 40 can be configured to cover a portion 52 of the side panel 26 that is adjacent to the window opening 46. The second glass pane 40 can have an inner surface 54, an outer surface 56, and a peripheral edge 58. The garnish panel 34 can be mounted onto the outer surface 56. The peripheral edge 58 can extend around a perimeter of the second glass pane 40 and can extend from and be connected to each of the inner surface 54 and outer surface 56 in a perpendicular relationship with each surface 54, 56.

The outer surface 56 can be offset from the outer surface 48 of the first glass pane 32 and the outer surface 50 of the side panel 26 in the transverse direction T of the vehicle 12. The outer surface 56 can be offset from the exterior surfaces 48, 50 by an amount that is sufficient for the exterior surfaces 42, 48, 50 to be, or appear to be, flush with each other.

The through hole 44 in the garnish panel 34 can be larger than the light aperture of the camera 36 so that the camera 36 can have an appropriate field of view of the space outside of the vehicle 12. Referring to FIG. 4, boundary lines V1 and V2 can delineate the field of view of the camera 36. In order to provide an appropriate size for the field of view, the through hole 44 may permit an observer of the outside of the vehicle 12 to see all or most of the camera 36.

The camera assembly 10 can include an encapsulation 60 that is connected to the second glass panel 40 and the camera 36 so the encapsulation 60 obstructs all but the light aperture of the camera 36. The encapsulation 60 can have a dark color with a matte finish. Thus, the encapsulation 60 can obscure the observers view of the camera 36 and provide the observer with a pleasant perception of the aesthetic appearance of the vehicle 12 and the camera assembly 10.

The encapsulation 60 can be formed from a rubber or other elastomeric material. The encapsulation 60 can be connected to the second glass pane 40 in any appropriate manner such as, but not limited to, elastic expansion of the encapsulation 60 by the second glass panel 40, over-molding onto the second glass panel 40, or adhesive. The encapsulation 60 can abut the camera 36 and the inner surface 54 and the peripheral edge 58 of the second glass panel 40.

The encapsulation 60 can include a first wall 62, a protrusion 64, a through hole 66 and a perimeter wall 68. The first wall 62 can abut the inner surface 54 of the second glass pane 40. The first wall 62 can be elongated in the longitudinal direction L of the vehicle 12 and extend across the inner surface 54 along the longitudinal direction L and the vertical direction V of the vehicle 12. The first wall 62 can be a flat wall or appear to one of ordinary skill as a flat wall.

The protrusion 64 can extend away from the inner surface 54 of the second glass pane 40 in a direction that intersects the longitudinal direction L and the transverse direction T of the vehicle 12. An acute angle can be formed between the inner surface 54 and the protrusion 64. The protrusion 64 can extend from a first portion 70 of the first wall 62 and generally toward a second portion 72 of the first wall 62 along the longitudinal direction L. The protrusion 64 can be spaced away from the field of view of the camera 36. The protrusion 64 can have any appropriate shape so that the protrusion 64 is spaced away from the field of view and also abuts the camera 36.

The through hole 66 can extend through the protrusion 64 and be adjacent to the second portion 72 of the first wall 62. The through hole 66 can be located on the optical axis A of the camera 36. The camera 36 can extend into the through hole 66. The through holes 44, 66 can have any appropriate shape such as, but not limited to, a polygon, a circle or an oval. The through hole 66 can have a first dimension D1 measured perpendicular to the optical axis A1 that is smaller than a second dimension D2 of the through hole 44 of the garnish panel 34 that is measured in the longitudinal direction L of the vehicle 12.

The perimeter wall 68 can encircle the first wall 62 and protrude from the first wall 62 in the transverse direction T of the vehicle 12 toward an exterior of the vehicle 12. The perimeter wall 68 can surround the second glass pane 40 and abut the peripheral edge 58 of the second glass pane 40.

Referring to FIG. 4, the garnish panel 34 can have a third dimension D3 (e.g., length, circumference, perimeter) and the second glass pane 40 can have a fourth dimension D4 (e.g., length, circumference, perimeter), each measured in the longitudinal direction L of the vehicle 12. The third dimension D3 of the garnish 34 can be greater than the fourth dimension D4 of the second glass pane 40 and the garnish panel 34 can overhang beyond the peripheral edge 58 of the second glass pane 40 in the longitudinal direction L. The perimeter wall 68 of the encapsulation 60 can abut the inner surface 74 of the garnish panel 34 where the garnish panel 34 overhangs from the peripheral edge 58.

Returning to FIG. 3, the encapsulation 60 can include a lip seal 76 that abuts the side panel 26. The lip seal 76 can protrude from the perimeter wall 68 generally in the longitudinal direction L of the vehicle 12. That is, the encapsulation 60 can extend from the peripheral edge 58 of the second glass pane 40 to the side panel 26 in the longitudinal direction L of the vehicle 12. Thus, the encapsulation 60 can form a seal between the second glass pane 40 and the side panel 26.

The camera assembly 10 can include an adhesive sealant that connects the garnish panel 34 onto the second glass pane 40. The adhesive sealant is schematically illustrated in FIG. 3 as a dotted line triangle and can include a first bead 78 and a second bead 80. The first bead 78 can be adjacent to and extend along the peripheral edge 58 of the second glass pane 40. The first bead 78 can follow and be spaced inwardly from the entire peripheral edge 58. The second bead 80 can be adjacent to surround the through hole 44 of the garish panel 34. The second bead 80 can be spaced outwardly from the through hole 44. The beads 78, 80 can adhere the inner surface 74 of the garnish panel 34 to the outer surface 56 of the second glass pane 40 and seal the connection against fluid, dust and debris.

The camera assembly 10 can include an adhesive sealant 82 that adheres the encapsulation 60 to the side panel 26. The adhesive sealant 82 is schematically illustrated in FIG. 3 as a dotted line triangle and can be a bead that is adjacent to and spaced inwardly from the outer perimeter of the encapsulation 60. The adhesive sealant bead 82 can follow the entire perimeter of the encapsulation 60.

The adhesive sealant beads 78, 80, 82 can include any appropriate material that can bond the material of the garnish panel 34 to the second glass pane 40 and bond the encapsulation 60 to the side panel 26. In exemplary embodiments, the beads 78, 80, 82 can be formed from a urethane material, a silicon material, an acrylic material or silane-modified polymer.

The camera assembly 10 can include a mount 84 that can secure the camera 36 to the side panel 26. The mount 84 can be mounted onto the side panel 26 by a pair of threaded fasteners 86. Each of the threaded fasteners can include a nut that is welded onto the side panel 26 and a bolt that extends through a through hole 88 in the mount 84 and a through hole 90 in the side panel 26. The nut can be centered on the through hole 90 in the side panel 26.

The side panel 26 can include a camera opening 92 that is spaced away from the window opening 46 in the longitudinal direction L of the vehicle 12. The camera opening 92 can have a fifth dimension D5 that is measured in the longitudinal direction L. The fifth dimension D5 can be greater than the second dimension D2 and less than the fourth dimension D4 and the third dimension D3. The second glass pane 40 can span the camera opening 92 in the longitudinal direction L and can be spaced away from the camera opening 92 in the transverse direction T of the vehicle 12. The mount 84 can span the camera opening 92 in the longitudinal direction L.

Referring to FIGS. 1-3, the camera assembly 10 can include a molding 94 that is connected to and extends around the perimeter of the first glass pane 32. Referring to FIG. 3, the molding 94 can be formed from a rubber or other elastic material and can include a lip seal 96 that abuts at least one of the garnish panel 34 and the encapsulation 60. That is, the molding 94 can extend from the first glass pane 32 to the garnish panel 34 (and/or the encapsulation 60) in the longitudinal direction L of the vehicle 12 and seal a space between the first glass pane 32 and the garnish panel 34 and the encapsulation 60 from fluids dust and debris.

Referring to FIG. 4, the camera 36 can oppose the inner surface 54 of the second glass pane 40 generally in the transverse direction T of the vehicle 12. The optical axis A1 of the camera 36 can intersect the longitudinal direction L of the vehicle 12 at an oblique angle.

The through hole 44 of the garnish panel 34 can have a hole axis A2 and the optical axis A1 of the camera can intersect the hole axis A2. The camera 36 can be offset with respect to the hole axis A2 in a direction that is away from the first glass pane 32. That is, the camera 36 can be spaced away from the hole axis A2 in the longitudinal direction L of the vehicle 12.

The vehicle 12 can include one or more spaces along the side of the vehicle 12 that cannot be observed by the operator of the vehicle 12 with a rearview mirror or side view mirror. These unobservable spaces can be referred to as blind spots. The blind spots can be located at the sides of the vehicle 12 and behind the vehicle 12. In exemplary embodiments, the camera 36 can be a component of a system that monitors the blind spot(s) of the vehicle 12 and warns the operator of the vehicle 12 when an object is present in the blind spot(s). Of course, the camera 36 and safety camera assembly 10 can be used for other purposes such as in autonomous driving systems or any other communications system that desires information related to the environment surrounding a vehicle 12.

The camera 36 can be any appropriate optical device, such as, but not limited to, a charge-coupled device ("CCD"), that can capture images of the space outside of the vehicle 12 and transmits the image data to an image processing unit. The image processing unit can be configured to control a video display and/or provide an audio and/or a video message to the operator of vehicle 12 that is indicative of the real-time status of the space outside the vehicle 12. The camera 36 can be referred to as a rear safety camera.

In summary, the garnish panel 34 can have an exterior surface that is visually compatible with the aesthetic appearance of privacy glass while the light transmissivity of the green glass of the second glass pane 40 can be sufficient for the desired operation of the camera 36. Moreover, the second glass pane 40 can be encapsulated by the encapsulation 60 and the encapsulation 60 can include the projection 64 that goes around the lens of the camera 36 to provide a good appearance when a user, owner, potential user or potential owner looks into the through hole 44 in the garnish panel 34 from an exterior view of the vehicle 12. Thus, the camera assembly 10 can allow a user or owner of the vehicle 12 to obtain the benefits of privacy glass with the additional benefit of a camera aesthetically concealed behind the privacy glass.

The second glass pane 40 and the garnish panel 34 can be adhered to the side panel 26 with an adhesive sealant to create a water tight seal. This can allow the camera 36 to be mounted in a dry area inside the body of the vehicle 12 and create a flush appearance when a user, owner, potential user or potential owner observes the vehicle 12 from the outside.

Thus, the camera assembly 10 can provide an aesthetic benefit that is compatible with privacy glass while maintaining the desired imaging performance for camera 36.

While certain embodiments of the invention are described above, it should be understood that the invention can be embodied and configured in many different ways without departing from the spirit and scope of the invention.

FIGS. 1 and 2 depict a four-door vehicle such as a sports-utility vehicle or crossover vehicle. However, the camera system 10 can be used with any vehicle that is configured for travel along any one or combination of improved, unimproved, and unmarked paths. For example, embodiments are intended to include or otherwise cover any type of vehicle, including a two-door vehicle, station wagon, minivan, truck, other types of all-terrain vehicle (ATV), semi-tractor, off-highway vehicle, motorcycles, boats, planes, etc.

Instead of located at the side of the vehicle 12, the camera assembly can be mounted at the rear end of the vehicle 12 adjacent to the rear windshield 20 or even in a front window depending on the application of the vehicle and imaging requirements.

Instead of being located towards the rear of the first glass pane 32 in the longitudinal direction L of the vehicle 12, alternate embodiments can include the second glass pane 40 and the garnish panel 34 located in front of the first glass pane 32 in the longitudinal direction L, or below or above the first glass pane 32 in the vertical direction V of the vehicle 12.

In alternate embodiments, one or both of the glass panes 32, 40 and the garnish panel 34 can have inner and outer surfaces that are curved with respect to any of the longitudinal direction L, the transverse direction T and the vertical direction V of the vehicle.

The glass panes 32, 40 and the garnish panel 34 can have any regular shape or any irregular shape. Any of the panels 26, 34 can be multi-part structures or a single integrally formed by stamping or molding a continuous material. Similarly, the molding 94, the mount 84, and the encapsulation 60 can each or all be integral with each other in various combinations, and/or can be integral with the side panel 26, or they can all be separate structures. The panels 26, 34, encapsulation 60, mount 84, and molding 94 can be plastic, metal, rubber, ceramic or other known material or combination of materials.

Alternate embodiments can include any appropriate manner of connecting the mount 84 onto the side panel 26 such as, but not limited to, clip(s), clamp(s), adhesive, or any combination of these items.

What is claimed is:

1. A camera assembly for a vehicle having a side panel and a window opening in the side panel, the camera assembly comprising:
    a first glass pane configured to cover the widow opening and having a first light transmissivity;
    a second glass pane located adjacent the first glass pane and configured to cover a portion of the side panel that is adjacent to the opening, the second glass pane having a second light transmissivity that is greater than the first light transmissivity;
    a garnish panel extending across the second glass pane; and
    a camera opposing the second glass pane.

2. The camera assembly according to claim 1, wherein
    the first glass pane has a first color and the second pane has a second color that is different from the first color, and
    the garnish panel is plastic and includes an exterior surface that has a gloss color that matches the first color.

3. The camera assembly according to claim 1, wherein the first glass pane is privacy glass and the second glass pane is green glass.

4. The camera assembly according to claim 1, wherein
    the second glass pane has an outer surface and the garnish panel is mounted onto the outer surface,
    the first glass pane has a first exterior surface, and
    the garnish panel has a second exterior surface that is co-planar with the first exterior surface.

5. The camera assembly according to claim 1, further comprising:
    an encapsulation, wherein
    the second glass pane has an inner surface, an outer surface, and a peripheral edge, the peripheral edge extends around a perimeter of the second glass pane and extends from and is connected to each of the inner surface and the outer surface,
    the encapsulation abuts the inner surface and the peripheral edge.

6. The camera assembly according to claim 5, wherein
    the encapsulation includes a first wall that abuts the second glass pane, a protrusion that extends away from inner surface, and a through hole that extends through the protrusion and is adjacent to the first wall, and
    the camera extends into the through hole.

7. The camera assembly according to claim 1, further comprising:
    a urethane adhesive connecting the garnish panel onto the second glass pane.

8. The camera assembly according to claim 1, further comprising:
    a mount configured to be mounted onto the side panel, wherein
    the camera is mounted onto the mount.

9. The camera assembly according to claim 1, wherein
    the garnish panel includes a through hole having a hole axis, and
    the camera has an optical axis that intersects the hole axis.

10. The camera assembly according to claim 9, wherein the camera is offset with respect to the hole axis in a direction that is away from the first glass pane.

11. A camera assembly for a vehicle, comprising:
a camera;
a first glass pane having a first light transmissivity and being spaced away from the camera;
a second glass pane adjacent to the first glass pane and overlapping the camera, the second glass pane has a second light transmissivity that is greater than the first light transmissivity;
a garnish panel covering at least a portion of the second glass pane and including a through hole aligned with the camera; and
an adhesive sealant connecting the garnish panel to the second glass pane.

12. The camera assembly according to claim 11, wherein the camera has an optical axis that extends through the through hole, and
the second glass pane is at a location along the optical axis that is between the camera and the garnish panel.

13. The camera assembly according to claim 12, further comprising:
an encapsulation connected to the second glass pane, the encapsulation abuts the camera and includes a through hole that is located on the optical axis.

14. A vehicle comprising:
a side panel extending along a longitudinal direction of the vehicle, the side panel including a window opening,
a first glass pane mounted on the side panel, covering at least a portion of the widow opening and having a first light transmissivity;
a second glass pane mounted on a portion of the side panel that is adjacent to the window opening in the longitudinal direction, the second glass pane has a second light transmissivity that is greater than the first light transmissivity, the second glass pane includes an outer surface and an inner surface;
a garnish panel adjacent to the outer surface of the second glass pane; and
a camera located adjacent and opposing the inner surface of the second glass pane.

15. The vehicle according to claim 14, further comprising:
an encapsulation having a first wall abutting the inner surface of the second glass pane and a projection that extends away from the inner surface of the second glass pane, wherein
the camera abuts each of the first wall and the projection,
a first adhesive sealant adheres the garnish panel to the outer surface of the second glass pane, and
a second adhesive sealant adheres the encapsulation to the side panel.

16. The vehicle according to claim 15, wherein
the second glass pane has a green color,
the first glass pane has a color that is different from the green color and includes a first exterior surface,
the side panel includes a second exterior surface,
the garnish panel includes a third exterior surface that is co-planar with each of the first exterior surface and the second exterior surface, and the second exterior surface has a gloss color that matches the color of the first glass pane.

17. The vehicle according to claim 16, wherein at least one of the first adhesive sealant and the second adhesive sealant is a urethane adhesive sealant.

18. The vehicle according to claim 15, wherein the encapsulation includes a lip seal that abuts the side panel.

19. The vehicle according to claim 18, further comprising:
a molding connected to the first glass pane, and the molding includes a seal lip that abuts at least one of the encapsulation and the garnish panel.

20. The vehicle according to claim 14, further comprising:
a mount, wherein
the side panel includes a camera opening that is spaced away from the window opening in the longitudinal direction,
the second glass pane spans the camera opening in the longitudinal direction and is spaced away from the camera opening in a transverse direction of the vehicle,
the second glass pane has an exterior surface facing away from the vehicle and the first glass pane has an exterior surface facing away from the vehicle, the exterior surface of the first glass pane and the exterior surface of the second glass pane are offset from each other in the transverse direction of the vehicle,
the mount is adjacent to the side panel and spans the camera opening in the longitudinal direction, and
the camera is mounted onto the mount and has an optical axis that extends through the camera opening.

* * * * *